Figure 1:
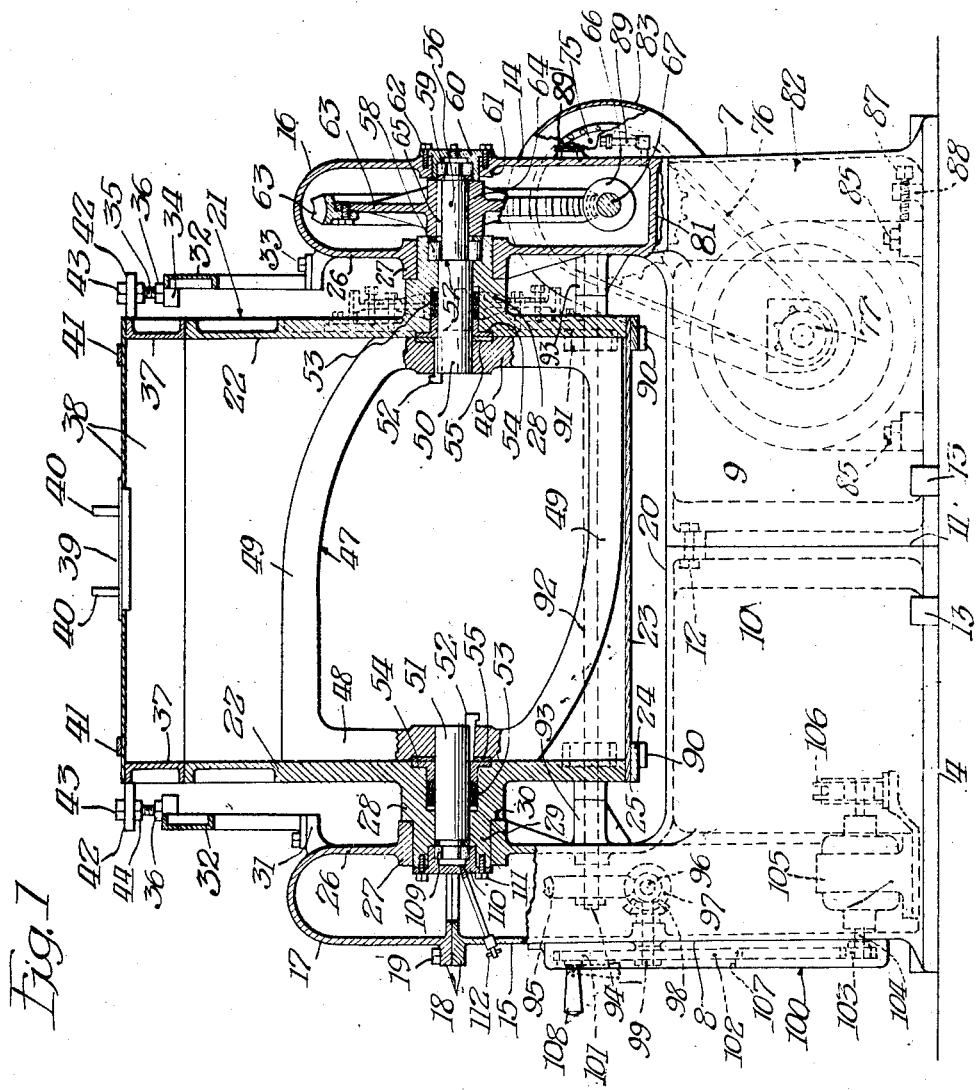

July 24, 1928.

F. NOTZ ET AL 1,678,193

DOUGH MIXING MACHINE

Filed July 23, 1925

2 Sheets-Sheet 1

Inventors:
Felix Notz,
George Royan, by Fisher, Fowle, Clapp & Soans, Attys.

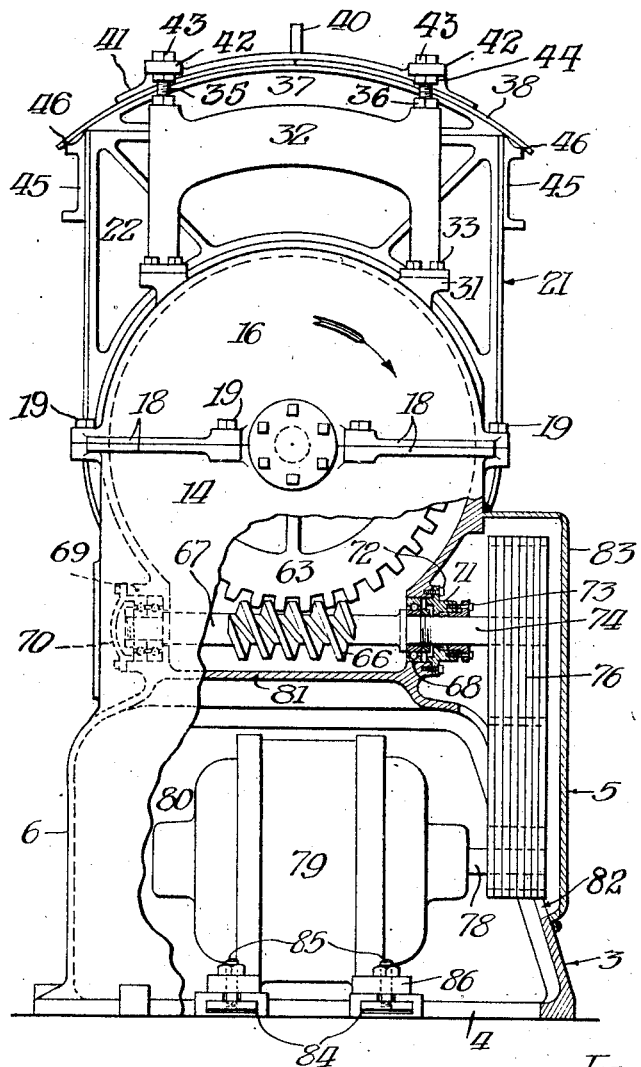

Patented July 24, 1928.

1,678,193

UNITED STATES PATENT OFFICE.

FELIX NOTZ AND GEORGE ROYAN, OF CHICAGO, ILLINOIS, ASSIGNORS TO AMERICAN OVEN & MACHINE COMPANY, OF CHICAGO, ILLINOIS, A CORPORATION OF ILLINOIS.

DOUGH-MIXING MACHINE.

Application filed July 23, 1925. Serial No. 45,491.

The present invention relates to a novel machine for mixing dough or like plastic material, but especially for the mixing and kneading of dough from which bread and like bakery products are made, and has special reference to that class of dough mixing machines in which one or more revoluble mixing frames or blades are arranged within the mixing chamber and adapted to be revolved about the axis of rotation, as shown in the prior patents to Felix Notz and James McBriar No. 831,372, dated September 18, 1906, and to Felix Notz and George Royan No. 1,537,259, dated May 12, 1925.

Among the objects of the invention are to provide a novel and extremely simple and effective machine for the above purpose which will serve to thoroughly and expeditiously mix the ingredients of the batch of dough and impart to the dough a more desirable quality than heretofore possible, to insure an even whiter, better and a more uniformly mixed dough which is drier and tougher; to provide a machine which is capable of greater capacity and which will prepare the dough in less time than previously accomplished with dough mixing machines and consumes less power than other high-speed dough mixing machines; to provide a novel general assembly including the frame structure and driving mechanism for the mixing arms or blades, and means for tilting the mixing chamber or receptacle to permit the same to be either turned downwardly to discharge its dough contents or upwardly to receive a new batch, such means being power-driven or manually operated and hidden or precluded from view and protected together with the driving mechanism of the mixing arms to prevent injury to the operator or from collecting dough or foreign matter which would seriously impede or interefere with the efficient operation of the machine; to eliminate excessive noise and provide for easy and quiet operation without undue friction; to provide for convenient lubrication, adjustment, repair and replacement of parts including the bearings, packings and driving mechanisms and prevent the dough from passing into the bearings or working parts and the lubricant from escaping or leaking into the dough and rendering the same unusable; and generally to improve, enhance and simplify the structure of machines of the character to which the invention relates, to render the same more compact in addition to enclosing the working parts and providing a machine which may be made in various sizes and with greater capacity than heretofore possible, as well as to improve the appearance of the machine and render the same capable for efficient and economical manufacture.

The invention also consists in certain other features of novelty to be hereinafter more fully described, illustrated in the accompanying drawings and particularly pointed out in the claims at the end of the specification.

In the drawings:—

Fig. 1 is a vertical, longitudinal, axial, sectional view of our novel dough mixing machine, the upper part being in section and the lower part in elevation with parts broken away to disclose the interior structure, and Fig. 2 is an end elevation of the machine looking toward the left in Fig. 1 with parts broken away to disclose the interior structure and driving mechanism for the mixing arm.

Referring to the drawings in detail, 3 designates the frame of the machine having a base 4 adapted to rest upon and be secured to the floor. The frame 3 has side walls 5 and 6 and end walls 7 and 8 extending upwardly from the base and properly shaped to house the working parts, as will be hereinafter more fully described.

Instead of dividing the frame or casing vertically in a longitudinal and axial direction, it is composed of two sections 9 and 10 joined transversely at 11, thus dividing the frame intermediately of its length transversely and perpendicularly or normal to the axis of the machine, the parts being brought together and bolted or otherwise suitably joined in assembled relation to form a unitary structure as indicated at 12 and anchored as at 13 to the floor or other horizontal supporting surface upon which the machine rests.

The ends 7 and 8 are extended above the intermediate portion of the frame to provide housings 14 and 15 which have removable and substantially semicircular top closed sections 16 and 17, both being flanged as at 18 and joined in assembled relation through said flanges by means of screws, bolts or other fastenings as indicated at 19. By this means the top portions of the housings are closed but rendered detachable so that the interior drive parts, to be hereinafter more fully described, are rendered readily accessible. This structure provides end bearings in the housings 14 and 15 and an intermediate opening 20 to accommodate a mixing chamber 21 of any desirable or familiar shape such as usual in this art and shown in the prior patents above referred to. In the present instance this chamber comprises a hopper-like structure or drum having end plates or heads 22 suitably cored out to provide for lightness while maintaining the necessary rigidity and strength, and a peripheral plate or lateral section 23 rimmed as at 24 around the ends and secured to the peripheral edges of the end plates as indicated at 25.

The inner walls 26 of the housings 14 and 15 are formed with bearings 27 and the ends of the mixing chamber or plates 22 constituting the drum ends, are provided with outwardly extending hubs or sleeves 28 having reduced portions 29 entering the bearings or bearing sleeves 27 and shoulders 30 formed thereby to abut the inner ends of the bearings and prevent the mixing chamber from shifting endwise, that is to take up end thrust.

Mounted upon the removable housing sections 16 and 17 at the inside and bolted to bracket arms 31 formed thereon and extending inwardly therefrom, are trusses or upright supports 32 comprising vertical end members bolted to the bracket arms as indicated at 33 and cross-members connecting the same in the form of integral castings having horizontal inwardly extending lugs 34 at the upper ends of said vertical end members provided with threaded sockets or holes in which adjustable supporting screws 35 are threaded. Nuts 36 are threaded on the screws to engage the top surfaces of the truss webs to hold the screws in vertically adjusted positions.

A segmental top section 37 is arranged on and secured to the mixing chamber and has its walls fitting over the top edge of said chamber and a cover 38 fitted thereover to close the top of the stationary section and chamber to protect the contents. The cover 38 may be provided with a supplemental closure 39 having handles 40 for manipulating the same. In order to support the cover over the stationary top section 37, the cover is provided with reinforcements 41 having outwardly projecting apertured arms 42 through which the adjusting screws 35 are engaged with the heads 43 in contact with the top faces of the arms and nuts 44 clamped against the bottom surfaces of the arms by adjustment on the screws whereby the cover 38 may be securely held against movement and adjustably supported over the mixing chamber together with the section 37. It will also be apparent that the cover 38 may be raised or lowered to secure proper fit with the section 37 through the medium of the screws 35 and nuts 36 whereby free movement of the mixing chamber from receiving or operative mixing position to a tilted and discharging position or vice versa, may be obtained without undue friction or leaving gaps between the interfitted parts such as would permit the entrance of foreign matter into the mixing chamber to commingle and spoil the batch of dough contained therein. In order to prevent the dough from leaking out and dropping down on the machine and floor, or being splashed or thrown out from the machine when the machine is in operation or the receptacle tilted, scrapers 45 are provided at the front and back of the receptacle with scraping edges 46 projecting slightly above the top edges of the wall 23 beneath and in contact with the bottom of the cover 38 to scrape the dough therefrom when the receptacle or mixing chamber is moved into a tilting position to discharge the contents or into an upright or receiving position which it is adapted to maintain during the mixing operation.

Within the mixing chamber 21 is mounted a revoluble mixing frame or arm 47 which is formed of two end bars 48 and two connecting or cross-arms 49 of any suitable type, double or single as shown and described in the patents above alluded to, but preferably of the type shown in the patents to Notz and Royan No. 1,537,259, granted May 12, 1925. In practice, the end bars and arms will be preferably formed as an integral casting and are mounted upon a central shaft which passes through suitable stuffing boxes in the end walls of the mixing chamber and provided with novel means at one or both ends whereby revolution may be imparted to the shaft and mixing frame or arms. In the preferred form shown in the drawings and more particularly in Fig. 1, the end bars are apertured to receive the inner ends of short shafts 50 and 51 projecting inwardly from the ends of the mixing chamber and secured or keyed in the apertures of the end bars as indicated at 52. These shafts project outwardly from the end bars of the mixing frame and are journaled in the hubs 28 with suitably interposed packings 53 having packing glands or bushings 54, the inner flanges of which form bearing plates in contact with annular bearing plates or washers 55 set in recesses in the end bars 48 of the mixing frame 47 around the apertures 50 thereof.

The shaft 50 has a reduced portion 56 forming a shoulder 57 adjacent to which the reduced portion of the shaft is revolubly mounted in a bearing 58. The extreme outer end of the shaft 50 is revolubly mounted in a bearing 59 contained within a flanged cap plate 60 fitted within a sleeved opening 61 in the outer wall of the housing 14 at the juncture of the lower stationary and upper detachable or removable sections therefor or the joint therebetween, as clearly seen in both Figs. 1 and 2 of the drawings. The removable bearing or cap plate 60 is detachably secured in position as by stud bolts or cap screws 62 engaging threaded sockets in the sleeve 61, thus permitting convenient access to the bearings for cleaning, repairing, replacement or lubrication.

A worm gear 63, preferably of the detachable rim type, has its hub 64 fixed or keyed to the reduced portion 56 of the shaft 50, as indicated at 65, within the housing 14 and is disposed in mesh with a worm 66 on a worm shaft 67 journaled in the sides of the housing 14 in the bearings 68 and 69 beneath the cylindrical portion of the housing 14, as clearly seen in Fig. 2 of the drawings. The bearing 68 is preferably of the single or radial ball bearing type while the bearing 69 is preferably of the duplex ball bearing type and has a cap 70 closing over the end of the shaft 67 with suitable means for taking up end thrust such as by reducing the end of the shaft within the bearing 69 to form a shoulder to engage the bearing and prevent axial displacement of the shaft. The bearing 68 is provided with a detachable bearing sleeve 71 secured in position to the casting of the housing, as indicated at 72, and having a detachable packing gland 73, preventing the escape of the lubricant from within the housing of the worm gear. The side wall 5 of the housing has a slight lateral projection to receive the extended end 74 of the shaft 67 which has a sprocket wheel 75 fixed thereto.

A silent running drive chain or belt 76 is trained around the sprocket wheel 75 and a sprocket wheel 77 secured to the shaft 78 of a motor 79, preferably of the electric type, mounted in a chamber 80 beneath the housing 14. For this purpose the bottom of the housing 14 is closed by the wall 81 while the back of the chamber 80 is open, as indicated at 82, to permit access to the motor and the projection of the side wall 5 of the casing or frame of the machine provides a housing 83 which is shaped to accommodate the belt 76, as clearly indicated in the drawings.

It is preferable to mount the motor upon the base 4, which latter is provided with guideways 84 receiving T-bolts 85 which extend through and connect with the base 86 of the motor frame in order to secure the motor in position and permit adjustment thereof as required to tighten the belt 76 and permit convenient mounting of the motor in position and assemblage and disassemblage of the parts. The bolts 85 are preferably provided at the corners of the motor base and when the nuts thereof are loosened, the motor may be slid in its slidable mounting through the medium of adjusting screws 87 engaging through threaded apertures of lugs 88 on the base 4. This permits convenient adjustment of the motor as desired. The housing 14 has an oil gauge 89.

Suitable means, as indicated at 89′, is provided for supplying lubricant to the worm gear within the housing 14. The bearings for the shafts 50 and 51 and the packings thereof, may be provided with the improved drum end and shaft packing retainer as illustrated which constitutes the subject matter of a separate application for patent, in which novel means is provided to fit around the Monel steel beater shaft and is adapted for retaining the packing as well as adjusting the pressure thereon and securely clamping the retainer and packing in position.

In order to provide means for tilting the mixing chamber from its upright position to discharge position or to raise the same to operative position during the mixing operation or when receiving a new batch of dough, the mixing chamber is provided externally on its wall 23 at the underside, with curved rack bars 90 with which mesh pinions 91 fixed upon a longitudinal shaft 92 disposed at one side of the mixing chamber and journaled in bearings 93 extending inwardly from the inner walls 26 of the housings 14 and 15, as clearly shown in Fig. 1 of the drawings.

One end of the shaft 92 projects into the housing 15 as indicated at 94, and this extended end carries a worm gear 95 within the housing. The worm gear 95 is disposed in mesh with a worm shaft 96 journaled at right angles to the shaft 92 in the housing 15. The worm shaft 96 has a beveled pinion or miter gear 97 fixed thereto in mesh with a similar pinion 98 fixed to the inner end of a short shaft 99 journaled in the outer wall of the housing 15 and a supplementary housing 100 provided on and projecting from the outer wall of the housing 15. The outer end of the shaft 99 within the housing 100 has a sprocket wheel 101 fixed thereto, around which a drive belt or chain 102 is trained. This drive belt is also trained around a sprocket 103 fixed to the outer end of the motor shaft 104 of the motor 105 within the lower portion of the housing 100. The motor 105 is supported adjustably in the lower portion of the housing 15 of the end section 10 and is provided with means indicated at 106 for connection with a source of current.

By adjustment of the motor 105 on its base, the driving chain or belt 102 may be tightened. A suitable switch is arranged for controlling each motor so that the mixing frame or arm may be driven as desired, while the mixing receptacle or drum may be moved into an upright position for receiving the batch and mixing the dough and subsequently tilted to one side in proximity to the top edges of the intermediate depressed portions of the sections 9 and 10 of the frame for the purpose of discharging the batch, after which the mixing receptacle is raised to receiving position. In the event that it is desired to manually tilt or move the mixing receptacle, the front portion of the auxiliary housing 100 is provided with an opening 107 over the sprocket wheel 101 and the latter carries a foldable handle 108 which may be extended for the purpose of manually turning the shaft 92 through the train of gearing to swing the mixing receptacle on its axis by rotation of the pinions 91 in mesh with the rack bars 90. When the motor 105 is employed for driving the shaft 92, the handle 108 is folded against the sprocket wheel 101 where it is out of the way.

It will be noted from Fig. 1 of the drawings that the short shaft 51 terminates at the inner wall 26 of the housing 15, instead of being extended through said housing in the manner that the shaft 50 projects through the housing 14 for connection with the driving gear by which the mixing frame is revolved, and is journaled in a bearing 109, preferably of the roller bearing type, within the adjacent hub 28. A closure plate and bearing sleeve 110 is capped over the end of the shaft 51 and is detachably secured in position as indicated at 111 whereby access may be had to the bearing for obvious reasons. A pressure lubricating device 112 containing grease is also mounted in the outer wall of the housing 15 and extends to the bearing 109 for the purpose of lubricating the latter.

From the foregoing, it will be seen that when the mixing receptacle has received the batch, the motor 79 is operated to drive the worm shaft 67 through the medium of the endless drive member or belt 76, thus imparting rotation to the worm gear 63 and consequently revolving the shaft 51 and mixing frame fixed thereto within the mixing receptacle.

A positive smooth and uniform drive of high speed may be imparted to the mixing arm and the dough will be caused to be shifted back and forth as a mass from one end of the mixing chamber to the other, in addition to being stretched and pulled as the mass is shifted and turned to effectively mix the ingredients and prevent adherence of the dough to the lateral and end walls of the mixing chamber. When the mixing operation is completed the receptacle is tilted by the means already described to discharge the contents after which the receptacle is raised to receive a new batch. The mixing, kneading, stretching and aerating processes are secured rapidly and owing to the structure of the device, the operation is carried on noiselessly. In addition, the machines may be made of considerably larger capacity than heretofore and yet secure smooth operation with the consumption of a minimum of power.

While we have shown and described our invention in a preferred form, we are aware that various changes and modifications may be made without departing from the principles of our invention, the scope of which is to be determined by the appended claims.

We claim as our invention:

1. In a dough mixing machine, a frame formed with a divided base, the respective sections of which are separable, and each of said sections adapted to receive a relatively separate and independent power plant, a housing formed on each section of the base, and said housings extending upwardly in spaced relationship to each other to form a passage therebetween adapted to receive a mixing frame and mixing chamber of a dough mixing machine, the latter being journalled in the housings, and the respective housings each receiving the drive connections from one of the power plants in the base to the mixing frame and chamber.

2. In a plastic mixing machine, a frame formed with a divided, hollow base, the respective sections of which are separable, and each of said sections adapted to receive a relatively separate and independent power plant, a hollow housing formed on each section of the base and communicating therewith to receive drive connections from the respective power plants, said housings arranged in spaced relationship to each other to form a passage therebetween adapted to receive a mixing frame and mixing chamber of a plastic mixing machine, the latter being journalled in the housings.

3. In a dough mixing machine, a frame formed with a transversely divided base, the respective sections of which are hollow and separable, and each of which is adapted to receive therein a relatively separate and independent power plant, an upright, hollow housing formed on each section of the base and communicating with the interior thereof to receive drive connections from the respective power plants, and said housings extending upwardly in substantially parallel spaced relationship to each other to form a passage therebetween adapted to receive a mixing frame and mixing chamber of a dough mixing machine, the latter being journalled in the housings, and both the mixing frame and the chamber being separately driven from the drive connections of the separate power plants.

4. In a mixing machine, a frame formed with a divided base, the respective sections of which are separable and adapted to be moved toward each other in assembly to house the power mechanism of a mixing machine, a housing formed on each section of the base and provided with a journal bearing, and said housings being arranged in assembly to form a passage therebetween and to align the journal bearings, and a mixing device having journal members adapted to be mounted in said bearings and in said pasage when the sections of the base are moved toward each other, said housings adapted to receive the drive connections from the power mechanism to the mixing device.

5. In a mixing machine, a frame formed with a divided, hollow base, the respective sections of which are separable and adapted to be moved toward each other in assembly to house the power mechanism of a mixing machine, an upright hollow housing formed on each section of the base and provided with a journal bearing, and said housings being arranged in assembly to be in spaced parallel relationship to each other to form a passage therebetween and to align the journal bearings, and a mixing device having journal members adapted to be mounted in said bearings and in said passage when the sections of the base are moved toward each other, said housings adapted to receive the drive connections from the power mechanism to the mixing device.

6. In a mixing machine, a frame formed with a transversely divided, hollow base, the respective sections of which are separable and adapted to be moved toward each other in assembly, and each section of which is adapted to receive a relatively separate and independent power plant, an upright, hollow housing formed on each section of the base and provided with a journal bearing, and said housings being arranged in assembly to be in spaced parallel relationship to each other to form a passage therebetween and to align the journal bearings, and a mixing device having journal members adapted to be mounted in said bearings and in said pasasge when the sections are moved toward each other, said housings communicating with the interior of the base sections to receive therethrough the drive connections from the power plants to the mixing device.

7. In a mixing machine, a frame formed with a transversely divided, hollow base, the respective sections of which are separable and adapted to be moved toward each other in assembly to house the power mechanism of a mixing machine, an upright hollow housing formed on each section of the base and provided with a journal bearing, and said housings being arranged in assembly to be in spaced parallel relationship to each other to form a passage therebetween and to align the journal bearings, and a mixing device having journal members adapted to be mounted in said bearings and in said passage when the sections are moved toward each other, said housings communicating with the interior of the base sections to receive therethrough relatively independent drive connections from the power mechanism to the mixing device.

8. In a mixing machine, a frame formed with a divided base, the respective sections of which are separable and adapted to be moved toward each other in assembly to house the power mechanism of a mixing machine, a housing formed on each section of the base and provided with a journal bearing, removable top sections formed in each housing above the journal bearing therein, and said housings being arranged in assembly to form a passage therebetween and to align the journal bearings, and a mixing device having journal members adapted to be mounted in said bearings and in said passage when the sections of the base are moved together, said housings adapted to receive the drive connections from the power mechanism to the mixing device.

9. In a mixing machine, a frame formed with a divided base, the respective sections of which are separable and adapted to be moved toward each other in assembly to house the power mechanism of a mixing machine, a housing integrally formed on each section of the base and provided with a journal bearing, removable top sections formed in each housing, said sections being joined to the base sections of the housings at the bearings, said housings being arranged in assembly to form a passage therebetween above the base sections and to align the journal bearings, and a mixing device having journal members adapted to be mounted in said bearings and in said passage when the sections of the base are moved together, said housings adapted to receive the drive connections from the power mechanism to the mixing device.

10. In a mixing machine, a frame formed with a divided base, the respective sections of which are separable and adapted to be moved toward each other in assembly to house the power mechanism of a mixing machine, a housing formed on each section of the base and provided with a journal bearing, upright supports formed on each of said housings, and said housings being arranged in assembly to form a passage therebetween and to align the journal bearings and the upright supports, and a mixing device having journal members and a cover, said journal members adapted to be received in said bearings, the cover engaged by the supports, and the mixing device disposed in the passage, when the sections of the base are moved together, said housings adapted to receive the drive connections from the power mechanism to the mixing device.

11. In a plastic mixing machine, a frame formed with a hollow base, hollow, relatively spaced apart housings formed on and communicating with the base and rising from the end portions of the base to form a passage between the housings to receive a mixing frame and mixing chamber of a plastic mixing machine, the latter being journaled in the housings, independent driving means in the end portions of the base below the respective housings, the drive connections to which are carried in the respective housings, and one of said housings having a bottom partitioning wall above the base forming an oil chamber for lubricating the drive connections therein.

12. In a plastic mixing machine, a frame formed with a base, relatively spaced apart housings formed on the base and rising from the end portions thereof to form a passage between the housings to receive a mixing frame and mixing chamber of a plastic mixing machine, the latter being journaled in the housings, independent driving means on the base having drive connections to the mixing frame and mixing chamber, the drive connections from one of the driving means to the mixing frame and being partially carried in one of the respective housings and said housing having a bottom partitioning wall above the base forming an oil chamber for lubricating the drive connections therein.

FELIX NOTZ.
GEORGE ROYAN.